3,401,282
ELECTRIC MOTOR WITH PERMANENT MAGNET STATOR POLES AND METHOD OF MAKING
Wladyslaw S. Zagorski, Morrison, Ill., assignor to General Electric Company, a corporation of New York
Filed Mar. 18, 1966, Ser. No. 535,572
17 Claims. (Cl. 310—42)

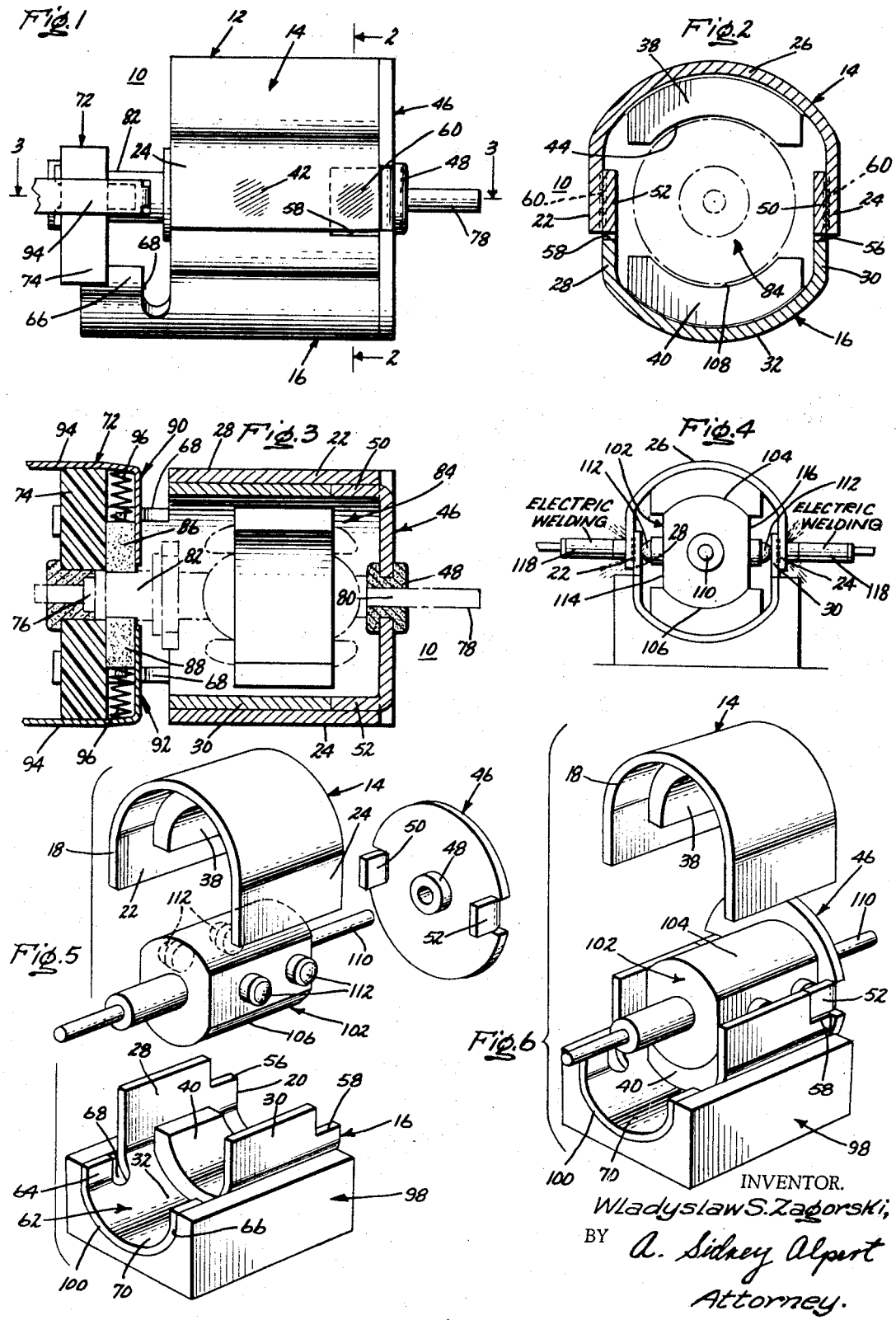

This invention relates to small horsepower dynamo-electric machines and more particularly to improved fractional horsepower electric motors especially of the permanent magnet direct current type as well as to an improved method of manufacturing and assembling such motors.

In recent years, there has been growing demand for dependable fractional horsepower electric motors, especially of the direct current type, which are unusually sturdy in construction and are capable of satisfactory operation for the expected life of the device in which they are incorparated without need for repair. For instance, it hand-held appliance applications, such as electric tooth brushes, the device incorporating the motor is subjected to extensive handling during use, with the motor shaft extending in various positions during such use. In addition, the motor is carried in the handle of the device in a totally enclosed location where it is inaccessible without destruction of the important parts of the device itself, making repair of the motor entirely impractical under the circumstances.

In the manufacture of motors for such applications, it is extremely difficult to produce the motors with the desired operating qualities and structural sturdiness, and yet at the same time, achieve economy in their production, especially where the overall dimensions of the motor are restricted by the device in which they are employed. By way of example, it is highly desirable from the standpoint of economy of material and size to provide a motor frame which also functions as part of the magnetic circuit for the stator of the motor. In addition, it is also desirable to utilize magnetizable segments which are used to define poles and part of the armature-receiving bore. This approach, however, raises a practical problem of attaining the proper dimensions for the bore and the necessary structural sturdiness for the motor, among other things, especially in the manufacture of permanent magnet type motors which use the magnets at angularly spaced apart positions in the poles of the stator.

It is further desirable to use basically the same tooling and manufacturing procedure in the mass production of motors having different outputs as dictated by a given application with the motors having approximately the same overall dimensions. This is particularly difficult to achieve in regard to permanent magnet type motors which are normally quite restricted for a given size motor as to the overall size and shape (e.g., radial, axial, and cross-sectional dimensions and configurations) of the magnets which may be utilized therein. A change in the construction of the motor and in the tooling is usually necessitated in order to derive the variation in outputs for the different motors. On the other hand, in many wound field DC motors, different field strengths for individual motors of the same general sizes are more readily obtainable.

Accordingly, it is an object of the instant invention to provide a novel and improved method of manufacturing fractional horsepower electric motors and to provide improved electric motors. It is a more specific object to provide an improved small electric motor and method of assembling the same which furnish at least some of the desirable features and overcomes the problems mentioned heretofore.

A still further object of the present invention is to provide a method of manufacturing electric motors of the type utilizing segmented permanent magnets in the stator which insures that the armature-receiving bore will be of an accurate and constant predetermined dimension regardless of variations in length, cross-sectional dimension or radial thickness of the permanent magnet segments used therein.

Yet another object of the present invention is to provide a fractional horsepower electric motor of the type utilizing a permanent magnet stator wherein the motor frame comprises a portion of the stator, the frame being constructed to provide a low-reluctance magnetic flux path.

It is another object of the present invention to provide an electric motor having a sturdy and rugged frame of unitary construction, the frame construction permitting the components of the motor to be quickly assembled and accurately aligned with respect to each other, and the alignment of the components to be retained.

A final object of the present invention is to provide an improved method of assembling fractional horsepower electric motors wherein parts of relatively wide tolerances may be utilized without the loss of extremely accurate end bearing alignment and uniformity of armature-receiving bores from motor to motor, thereby enabling preassembled armature assemblies to be effectively utilized in the motors while achieving an extremely accurate air gap.

In accordance with one form of my invention, I have provided an improved and economical yet sturdily constructed fractional horsepower electric motor for operation from a DC supply such as a battery. The electric motor includes a motor frame formed of cooperating generally U-shaped bracket sections, each bracket section having generally parallel legs and a bight joining the legs. The bracket sections are arranged with the legs of one projecting towards and being in overlapped relationship with the associated legs of the other, these associated legs being joined together in this exemplification by welding. An end shield section carrying a motor shaft bearing centrally thereof is fixedly mounted at one end of the motor frame by a pair of opposed projecting tabs. The tabs are disposed so as to join the end shield section directly to the legs of one bracket section by welds.

In this exemplification of the invention, a segment of magnetizable material is mounted in the bight portion of each U-shaped bracket section. The segments are in spaced confrontation and are magnetized at some point in the assembly of the motor so as to comprise permanent magnets. These permanent magnet segments form therebetween an armature-receiving bore of predetermined and accurate diameter, and together with portions of each bracket section, provide the flux path for the magnetic lines of flux. Thus, the magnet segments, together with the portions of these bracket sections comprise the motor stator.

One of the bracket sections includes an axially extending bearing and brush assembly support upon which is fixedly mounted a bearing and brush assembly carrying a second motor bearing. The bearing and brush assembly also carries a pair of spring-biased brushes for providing electrical contact with a commutator. A motor shaft is rotatably carried between the first and second motor bearings, the motor shaft in turn carrying an armature and commutator thereon. The armature is disposed within the aforementioned bore, and the commutator is disposed for contact with the aforementioned brushes.

Relative to my method of assemblying and manufacturing the motor, I initially provide support for at least one of the U-shaped brackets. As illustrated, the one bracket having notches in the legs thereof is supported, but, of course, as will occur to those skilled in the art, either or both brackets could be so supported. A magnetizable segment is first suitably mounted in the bight of each bracket. The brackets are then arranged with the legs of one projecting towards the legs of the other, or in other words, the brackets are concave inwardly. At this time, the brackets are moved until the segments engage a dummy armature or mandrel, with the legs of one bracket in overlapping contact with the legs of the other.

The dummy armature or mandrel has a diameter equal to the desired diameter of the armature-receiving or stator bore and includes a pin extending longitudinally from one end thereof. This pin is coaxial with the central axis of the dummy armature. An end shield including substantially centrally located bearing means is supported on the pin and moved into closing relationship with one end of the assembled brackets, with the bearing positioned on the pin. At this time, associated legs of each bracket are secured together as by spot welding, and the end shield is attached as by spot welding to the legs of one bracket. The dummy armature or mandrel is then withdrawn, leaving a stator-frame assembly of accurate internal bore diameter and having an end bearing accurately coaxial aligned with the bore at one end of the stator-frame assembly. A motor shaft carrying a wound armature and a commutator thereon is then mounted in the stator-frame assembly and a bearing and brush assembly added to complete the motor. The magnetizable segments may be magnetized at a suitable stage of assembly to provide the field flux for the motor.

By this improved manufacturing method, a precision armature-receiving bore dimension may be readily achieved even though magnet segments which are on non-uniform cross-section, unequal thickness, or unequal length are used, since this bore dimension is dependent upon the dummy armature. Also, inasmuch as the dummy armature supports the end shield, and the end shield is fixedly mounted to one end of the assembled brackets in the same operation as the brackets are secured, it is possible to achieve accurate alignment of the motor shaft bearing with the bore. Further, the associated legs of the bracket sections are provided in intimate contact, with no foreign matter or air gap therebetween, so as to provide a flux path of lowest possible reluctance.

The end of the frame assembly opposite the end at which the aforementioned end shield is mounted, includes an integrally formed axial extension on one bracket for receiving the bearing and brush assembly. This assembly includes a second end wall or shield carrying second motor shaft bearing means therein, and accurate alignment between the two bearings is possible because due to fixed relationship established therebetween through the one bracket. In this manner, a precision motor frame assembly is effected.

The subject matter which I regard as my invention is set forth in the appended claims. The invention, itself, however, together with further objects and advantages thereof, may be better understood by referring to the following description taken in connection with the accompanying drawings in which:

FIGURE 1 is a side elevation of the motor exemplifying my invention;

FIGURE 2 is a vertical sectional view taken substantially on the plane of the line 2—2 of FIGURE 1;

FIGURE 3 is a horizontal sectional view taken substantially on the plane of the line 3—3 of FIGURE 1;

FIGURE 4 is an end elevational view of the motor frame, supported in an exemplary supporting fixture and illustrating the manner in which the two frame sections are connected;

FIGURE 5 is an exploded perspective view of the motor illustrated in FIGURES 1–4 showing the relationship of the component parts and illustrating the manner in which the motor is assembled; and FIGURE 6 is an exploded perspective view similar to that of FIGURE 5 showing the motor in a second stage of assembly.

Referring now more particularly to the accompanying drawings in which like numerals indicate like parts throughout the several views, I have identified the electric motor embodying one form of the invention generally by the reference numeral 10.

The motor 10 includes a casing or frame which is extremely sturdy in construction and which I have generally denoted by reference numeral 12. The frame 12 is formed of a pair of generally U-shaped elongate bracket or frame sections 14 and 16 which are both composed of metallic magnetic material, suitably stamped from sheet material into the desired configuration. As will be best seen in FIGURES 2 and 6, each bracket section is inwardly concave and open at both ends 18 and 20. The upper bracket section 14 includes a pair of generally parallel spaced apart legs 22 and 24 joined by an arcuate bight 26, and the lower bracket section 16 includes similar generally parallel spaced apart legs 28 and 30 joined by an arcuate bight 32. A segment of magnetizable material 38, formed with an arc-shaped upper wall, is mounted on the inner surface of the bight 26, as for example by being glued thereto with a suitable resin adhesive, or may be otherwise suitably mounted. A second segment of magnetizable material, also having an arcuate outer wall is similarly fastened or mounted in the bight 32 of bracket section 16. These segments 38 and 40 are suitably magnetized at an appropriate stage of assembly of the motor and hence comprise permanent magnets of opposite polarity after being magnetized.

Referring now to FIGURES 2–4 in particular, it will be observed that the legs 22 and 24 of bracket section 14 nestingly overlap the legs 28 and 30 of bracket section 16 longitudinally along the length of the frame 12, the inner surfaces of the legs 22 and 24 being in direct overlying contact with the outer surfaces of the legs 28 and 30 respectively. This intimate contact is necessary to provide the lowest possible reluctance path for magnetic flux, as any air space or foreign matter between the associated pairs of legs will result in increased reluctance. The associated leg pairs 22, 28 and 24, 30 are fastened together in this exemplification by the spot welds 42. Thus, it will be appreciated that with the bracket sections 14 and 16 disposed in this manner, i.e., disposed so as to be concave inwardly, the permanent magnet segments 38 and 40 are disposed in opposed confrontation forming therebetween an armature-receiving bore denoted by reference numeral 44. The armature-receiving bore 44 must be of sufficient diameter to receive an armature therein as well as to maintain an air gap between the permanent magnet segments 39 and 40 and the armature, in accordance with the well-known operating principles of this type motor.

Since it is desirable to close the open end 20 of the nested bracket sections as well as to provide an accurately aligned bearing at this end, I provide an end wall or shield generally denoted by reference numeral 46 for this purpose. The end shield 46 comprises a generally circular, planar member of suitable metallic material and it carries therein a sleeve type bearing 48. The bearing 48 is preferably disposed with its center axis coinciding with the center axis of the circular end shield. A pair of diametrically opposed, axially projecting parallel tabs 50 and 52 are integrally formed with the end shield 46 for supporting the end shield in its position at the open end 20 of the frame 12. The lowermost bracket section 16 includes a pair of diametrically opposed notches 56 and 58 in the legs 28 and 30 thereof respectively, the notches opening at the end 20 of the bracket section. The tabs 50 and 52 are disposed in the notches 56 and 58 respectively and in engagement with the inner surfaces of overlapped legs 22 and 24 respectively. The end shield 46 is thus mounted at the open end 20 of the frame in closing relationship therewith by the spot welds 60 with the tabs 50 and 52 welded to the legs 22 and 24 respectively. It will be appreciated, however, that the end shield could be readily mounted at the end 20 by other means, for example, by being attached to inwardly directed tabs on legs 28 and 30, or by being butt-welded to the ends of bracket sections 14 and 16.

The bottom bracket section 16 includes an axially extending portion generally denoted by reference numeral 62, which includes a pair of opposed generally parallel upstanding legs 64 and 66. These legs are spaced from the legs 28 and 30 by the notches 68 and are somewhat shorter than the legs 28 and 30. The legs 64 and 66 are joined by an arcuate bight 70 which comprises an axial extension of the bight 32. A bearing and brush assembly generally denoted by reference numeral 72 is mounted on the axially extending portion 62 of the bracket section 16.

The bearing and brush assembly 72 includes an end wall or shield 74, preferably of electrically insulative material, which is mounted on the opposite legs 64 and 66, thus extending transversely across the open end 18 of the frame 12. The end wall or shield 74 is relatively shorter than the frame and carries a sleeve type bearing 76 substantially centrally thereof so that when the shield 74 is positioned on the legs 64 and 66, the bearing 76 may be coaxially aligned with the bearing 48, and also coaxially aligned with the bore 44. This alignment is effected in a manner to be described more fully below.

A motor shaft 78 is rotatably carried in the motor frame 12 between the sleeve bearings 48 and 76. The motor shaft 78 includes a driving portion 80 at the end carried in bearing 48 and a commutator portion having commutator 82 thereon at the other end. Also carried on the motor shaft 78 between the commutator 82 and the driving portion 80 is an armature generally denoted by reference numeral 84. The rotatable assembly including the motor shaft 78 with commutator 82 and armature 84 carried thereon may preferably be of the general type set forth in copending application Ser. No. 356,904 of Richard W. Dochterman, now U.S. Patent 3,278,776, assigned to the same assignee as this application.

In order to supply current to the windings of armature 84, two diametrically opposed brushes 86 and 88 are provided. Preferably, the brushes 86 and 88 are composed of a silver graphite material in order to provide good electrical contact, low friction losses and a low voltage drop. The brushes 86 and 88 are supported in brush boxes 90 and 92, which boxes are of similar construction and are mounted in opposed relation on the back face of the end shield 74. Each brush box includes an axially extending terminal leg 94 of electrically conductive material, which legs 94 extend axially past the end shield 74 and are adapted for connection to a source of direct current, such as a battery. The terminal legs 94 further close the outer ends of the brush boxes 90 and 92. Supported in the brush boxes 90 and 92 and pressing against the legs 94 are compressible coil springs 96 which serve to bias the brushes 86 and 88 into engagement with the commutator 82, through the opened ends of the brush boxes. Suitable shunts (not illustrated) are provided to complete the electrical circuit between the terminal legs 94 and the brushes.

Having specific reference now to FIGURES 4–6, one form of assembly or manufacture of the motor 10 will now be explained. The segments 38 and 40 are first mounted in the bights 26 and 32 of the bracket sections 14 and 16 respectively. Such mounting is preferably effected by a glue or cement such as a suitable resin adhesive, but may be effected by any suitable mounting means. The bracket sections are then arranged with the legs of one projecting towards the legs of the other, as will become apparent by viewing FIGURE 6. A fixture generally denoted by reference numeral 98, supports the lowermost bracket section 16 to coarrange the bracket sections. It would be possible, however, to support both bracket sections in such or similar fixtures. By further reference to FIGURES 4–6, it will be appreciated that the fixture 98 has an arcuate slot or channel 100 extending longitudinally therethrough of the same general shape as the outer periphery of the bracket section 16.

The brackets are now moved into nested engagement with the legs of one overlapping the legs of the other and an accurate bore dimension is established. The bore is established by use of a dummy armature 102 having a pair of opposed curved faces 104 and 106 which is placed between the inwardly concave bracket sections, as for example, in the channel 100. It will be understood that the diametric dimension between the curved faces 104 and 106 of the dummy armature 102 is precisely equal to the desired dimension of the armature receiving bore 44, being equal to the diameter of the armature 84 plus the desired air gaps 108 between the armature 84 and the two segments 38 and 40.

An end shield is now mounted at one end of the brackets. This mounting is effected by means of a pin 110 which extends axially from the armature 102. The end shield carries a centrally located bearing 48 which is mounted on the pin 110 and the end shield 46 is then slipped forwardly on the pin until the tabs 50 and 52 reside in the notches 56 and 58 in legs 28 and 30 of bracket section 16. The upper bracket section 14, having been moved into nested engagement with the bracket section 16, with the legs 22 and 24 of bracket section 14 overlapping the legs 28 and 30, will ultimately provide the segments 38 and 40 in engagement with the arcuate faces 104 and 106 of the dummy armature 102 as shown in FIGURE 4.

It will be noted in FIGURES 4–6, that the dummy armature 102 has two pairs of diametrically opposed electrodes 112 thereon, the electrodes 112 projecting outwardly from the parallel side faces 114 and 116 of the dummy armature. One pair of these electrodes 112 will normally contact the inner surface of the legs 28 and 30 of bracket section 16 when the dummy armature 102 is placed in the bight 32 thereof. Another pair of the electrodes 112 will normally contact the inner surface of the tabs 50 and 52 when the end shield 46 is placed on pin 110 and the tabs 50 and 52 moved into notches 56 and 58. Thus, when the bracket sections 14 and 16 and the end shield 46 are assembled as described above, the electrodes 112 will be disposed within the frame 12 and outwardly oriented in contact with portions of the frame. At this time, as illustrated in FIGURE 4, welding electrodes 118 will be oriented with the inner electrode pairs and the frame parts may thus be spot welded at suitable locations to form an integral and rigid, unitary unit composed of the two welded bracket sections and the welded end shield. This integral unit will have a dimensionally controlled armature receiving bore including correctly positioned magnetizable segments 38 and 40 in opposed or confronting relationship and proper alignment of the various motor components including correct position both axially and radially of bearing 48 in relation to the bore and segments 38 and 40.

The dummy armature 102 is finally removed from the confines of the frame 12 and replaced by the armature assembly with the driving portion 80 journaled in the correctly aligned sleeve bearing 48. At this time, the armature and brush assembly is mounted on the legs 64 and 66 with the commutator portion of the motor shaft 78 mounted in the sleeve bearing 76. It will be appreciated, of course, that suitable removable shims (not illustrated) or other means may be used to align the end shield 74 and bearing 76 with bearing 48 due to the size of shield 74, and the shield will then be fixed on the legs 64 and 66 by glue or the like, and the shims removed. Alternatively, the shield may be accurately fabricated so that when it is mounted on the lugs 64 and 66, which also are accurately dimensioned, bearing 76 will be axially aligned with the bearing 48 without the use of shims or the like.

It will be appreciated that the segments 38 and 40 may be magnetized at any suitable time during the assembly of the motor depending upon the type of magnetizable material used. Thus, the segments may be magnetized prior to mounting in the bights 26 and 32, or after the brackets are welded together but prior to assembly of the motor shaft, or even after the motor shaft and brush and bearing assembly 72 are mounted in place.

From the foregoing description of the motor assembly, it will be apparent that portions of the pairs of overlapped legs 22 and 28 and 24 and 30, together with the permanent magnet segments 38 and 40 provide a closed flux path for the flux eminating from the permanent magnet segments. Thus, the bracket sections 14 and 16 serve the dual function of providing the motor frame and part of the motor stator. The welds used to fasten together the associated legs insure that the flux path will be of lowest possible reluctance as there will be no air gap or foreign matter between the leg pairs. Further, it will be appreciated from the foregoing description that neither variations in length or radial thickness, nor tapered or non-uniform cross-sectional dimensions of the permanent magnet segments 38 and 40 will effect the accuracy of the armature receiving bore 44 of the motor inasmuch as such variations are accounted for during the assembly of the frame. For example, if tapered segments are used, the brackets will compensate for such variation without affecting the internal bore or the alignment of the end shield bearing.

It should further be appreciated that the assembly of frame 12 provides low cost yet unusually sturdy construction while allowing high flexibility of use. This manufacturing method may be utilized with different length bracket sections or magnets, or with variable size or shape magnets, thereby allowing for variations in field strength and not on output for the same general size motor, and without necessitating different tooling for assembly of the motor. Incidentally, while the dummy armature was illustrated as having two pairs of opposed electrodes 112, it will be appreciated that with different size embodiments of the motor, additional or fewer electrode pairs may be involved in order to properly join the bracket sections.

Although in the illustrated embodiment of the invention the commutator end of the motor shaft was supported in an end wall or shield mounted on an axial extension of one of the bracket sections, it will be apparent that the axial extension could be eliminated and an end shield similar to that mounted at the driving end of the motor shaft could be utilized. It should also be appreciated that although I have shown and described a permanent magnet type motor construction and method of assembly, by way of illustration, my invention is also applicable to various other type motors, such as, for example, the wound field type. In this same regard, it will be understood that the embodiment which I have disclosed and described herein is intended for illustrative purposes only. It is intended therefore by the appended claims to cover all such modifications that fall within the true spirit and scope of the invention.

What I claim as new and desire to secure by Letters Patent of the United States is:

1. A method of manufacturing a dynamoelectric machine of the type having a permanent magnet stator-frame assembly comprising the steps of: positioning a magnetizable segment adjacent the bight of two spaced apart inwardly concave frame bracket sections, each of which bracket section has generally parallel legs joined by said bights; moving at least one of said frame bracket sections toward the other of said frame bracket sections until the legs of one are in close proximity to associated legs of the other with the said segments in spaced confrontation; establishing an armature-receiving bore of predetermined dimension between the segments; and joining together at least one pair of said associated leg portions.

2. The method set forth in claim 1 wherein said steps of establishing a bore of predetermined dimension includes the steps of: placing a mandrel having a diameter equal to the desired bore dimension between said frame bracket sections; moving at least one of said frame bracket sections until the magnetizable segments positioned in said bight portions engage said mandrel; and thereafter withdrawing said mandrel wherein an accurately dimensioned armature-receiving bore is formed between the segments.

3. The method set forth in claim 2 wherein the step of withdrawing occurs after the step of joining.

4. The method of claim 1 including the step of magnetizing said segments.

5. The method of claim 1 wherein the step of moving includes positioning the legs of one of said brackets in overlapped engagement with associated legs of the other bracket section with the bights thereof in spaced confrontation; said bore being established by moving said bight into engagement with a member placed therebetween of predetermined diameter; and thereafter withdrawing said member.

6. A method of assembling a stator-frame for dynamoelectric machines having a fixed frame of magnetic material, the frame including first and second inwardly concave frame sections having spaced apart legs joined by a bight, the frame also including an end shield having first bearing means therein accurately positioned in axial alignment with the axis of said bore, and a bearing and brush assembly including second bearing means accurately positioned in axial alignment with the axis of said bore, the method comprising the steps of: mounting a magnetizable segment in the bight portion of each said frame section; arranging the frame sections with the legs of one projecting towards the legs of the other with the segments in spaced confrontation; placing dummy means having a predetermined outer dimension between the segments; moving the legs of one of said frame members into close proximity with associated legs of the other of said frame members until the segments abut the dummy member so as to form a bore of predetermined diameter; fastening together the associated legs of the frame members; mounting said end shield at one end of said frame with the first bearing means in coaxial alignment with said bore; and withdrawing said dummy member.

7. The method set forth in claim 6 wherein said dummy member includes at least one electrode thereon for engaging the inner surface of one of the overlapped legs, the step of fastening comprising: orienting a welding electrode with said dummy electrode; contacting the outer surface of one of the overlapped legs with the welding electrode and thereby spot welding the associated legs of the two frame members.

8. The method of claim 6 wherein the steps of fastening together the legs and mounting the end shield comprise: thermally joining together the associated legs and thermally joining the end shield to at least one of said frame sections with the first bearing means in coaxial alignment with said bore.

9. An electric motor comprising: a motor frame including first and second cooperating bracket sections, at least portions of said bracket sections composed of magnetic material, each said section having a pair of generally parallel spaced apart legs connected by a bight, said bights being in spaced confrontation, the two legs of said first bracket section extending towards and being in contact with associated legs of said second bracket section and secured thereto, permanent magnet means disposed within said spaced bights defining an armature-receiving bore, said permanent magnet means in conjunction with said portions of said frame comprising a stator, a motor shaft having a driving portion and a commutator portion, commutator means on said shaft, an armature carried on said shaft and disposed within said bore, a bearing assembly including a first end wall disposed at one end of said frame and having first bearing means, said driving portion of said shaft journaled in said first bearing means, a brush and bearing assembly including a second end wall disposed at the other end of said frame and having second said hollow casing, said end shield section having bearing bearing means, and said commutator portion of said motor shaft journaled in said second bearing means.

10. The electric motor set forth in claim 9, said permanent magnet means being fixedly secured to said bights with substantial surface-to-surface contact therebetween, said permanent magnet means having arcuate inner faces defining said bore, and the associated legs being overlapped longitudinally of said motor frame.

11. The electric motor set forth in claim 10 wherein both legs of one bracket section are disposed outwardly of both legs of the other bracket section.

12. The electric motor set forth in claim 9 including tab means for securing said first end wall to said frame.

13. The electric motor set forth in claim 12 wherein said tab means comprises a pair of axially projecting tabs on said first end wall, said tabs being disposed in notches in the legs of one of said bracket sections and secured to the legs of the other of said bracket sections.

14. A stator-frame assembly for electric motors comprising: a hollow casing including a pair of cooperating frame sections, each said frame section having spaced apart legs connected by a bight and defining magnetizable segment receiving stations, at least two magnetizable segments mounted in said receiving stations and forming at least part of an armature-receiving bore of predetermined diameter, the legs of one of said frame sections projecting towards and being in overlapped relationship with associated legs of the other frame section, means for fastening together said associated legs at the overlapped portions thereof, portions of said frame sections providing at least a portion of the flux path between said magnetizable segments and an end shield section disposed at one end of means in axial alignment with the central axis of said bore.

15. The stator-frame assembly of claim 14 wherein said frame sections are generally U-shaped in cross section, the legs of each frame section being generally parallel, and said magnetizable segments being mounted on the inner surfaces of said bight in spaced confrontation.

16. The stator-frame assembly of claim 14 wherein said end shield section being fixedly connected to the frame sections by tabs extending from one of the sections and joined to an adjacent portion of at least one other of the sections.

17. The stator-frame assembly of claim 14 wherein both legs of one of said frame sections are nested between associated leg of said other frame section, said associated overlapped legs being spot welded together, said end shield including tab means thereon, said tab means being spot welded to the legs of said other frame section, and the legs of said one frame section having notches therein for accommodating said tab means.

References Cited

UNITED STATES PATENTS

| | | | |
|---|---|---|---|
| 2,151,561 | 3/1939 | Morrill | 310—258 |
| 2,513,226 | 6/1950 | Wylie | 310—154 |
| 2,716,709 | 8/1955 | Rowe | 310—254 |
| 3,021,444 | 2/1962 | Simmons et al. | 310—259 |
| 3,095,515 | 6/1963 | Case et al. | 310—43 |
| 3,135,887 | 6/1964 | Schaffan | 310—154 |
| 3,156,838 | 11/1964 | Winther | 310—42 |

MILTON O. HIRSHFIELD, *Primary Examiner.*

WARREN E. RAY, *Assistant Examiner.*